United States Patent [19]

Little

[11] Patent Number: 4,997,154
[45] Date of Patent: Mar. 5, 1991

[54] QUICK RELEASE CLAMP ASSEMBLY

[76] Inventor: Roy M. Little, 23819 - 78th Ave. W., Edmonds, Wash. 98020

[21] Appl. No.: 351,418

[22] Filed: May 11, 1989

[51] Int. Cl.$^5$ ............................................. A47B 96/06
[52] U.S. Cl. ................................ 248/225.31; 280/647; 297/DIG. 4
[58] Field of Search ........................ 248/225.31, 222.1; 403/DIG. 8, 321; 280/647, 289 WC; 297/44, 440, DIG. 4, 49; 211/192

[56] References Cited

U.S. PATENT DOCUMENTS

| | | | |
|---|---|---|---|
| 2,126,026 | 8/1938 | Munson | 403/321 X |
| 4,020,613 | 5/1977 | Reynolds | 403/321 |
| 4,493,488 | 1/1985 | Panaia | 280/289 WC |
| 4,629,246 | 12/1986 | Fulton | 297/DIG. 4 |
| 4,678,233 | 7/1987 | Chabrol | 297/DIG. 4 |
| 4,679,816 | 7/1987 | Rikonen | 280/242 WC |
| 4,768,744 | 9/1988 | Leeds | 248/284 X |

FOREIGN PATENT DOCUMENTS 1201742  9/1965  Fed. Rep. of Germany ........ 248/99

Primary Examiner—J. Franklin Foss
Attorney, Agent, or Firm—H. Albert Richardson, Jr.

[57] ABSTRACT

A quick release clamp assembly for retaining a hook type support bracket on a shaft. The clamp assembly can be used, for example, to secure a seat and backrest to the frame of a foldable wheelchair. The clamp assembly includes a clamp adapted to be attached to a frame member of the chair and a cam rotatably mounted to the clamp for operation between an open and a closed position for retaining the bracket on the frame member. In the preferred embodiment the cam also includes an over the center protrusion which tends to prevent the inadvertent opening of the cam and release of the bracket.

18 Claims, 3 Drawing Sheets

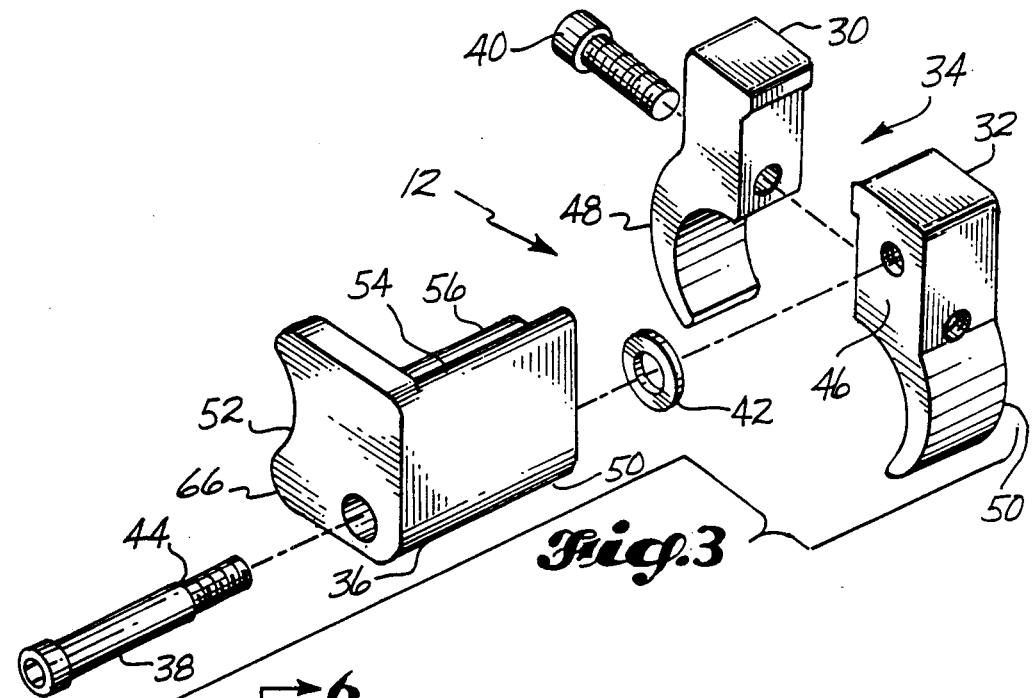
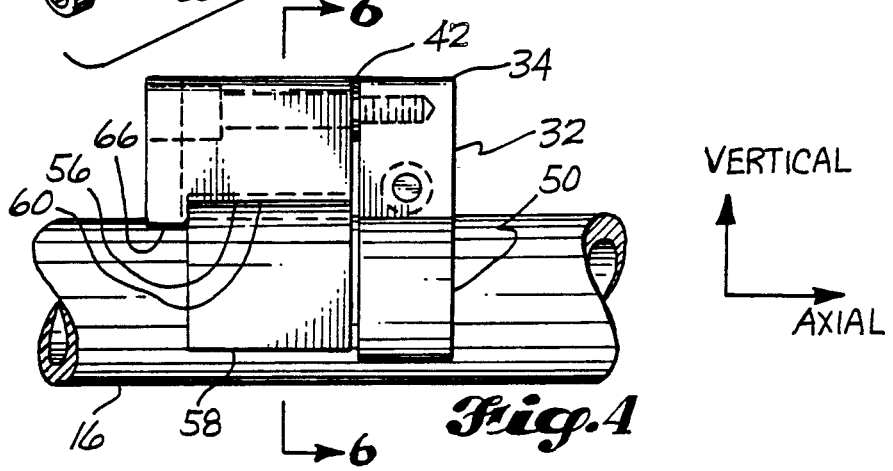
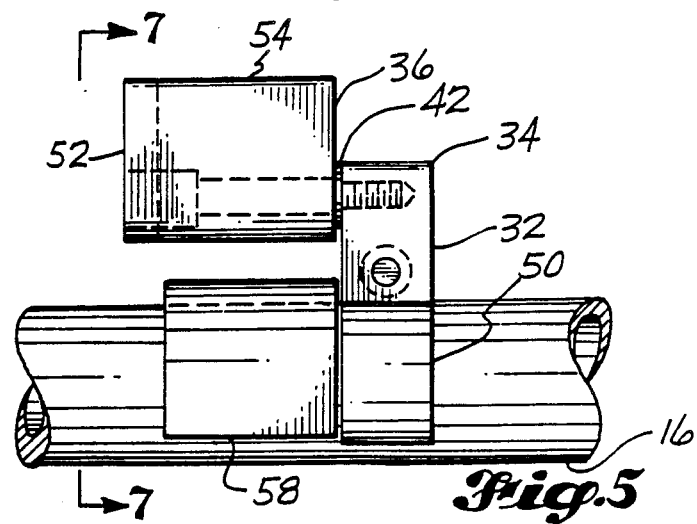

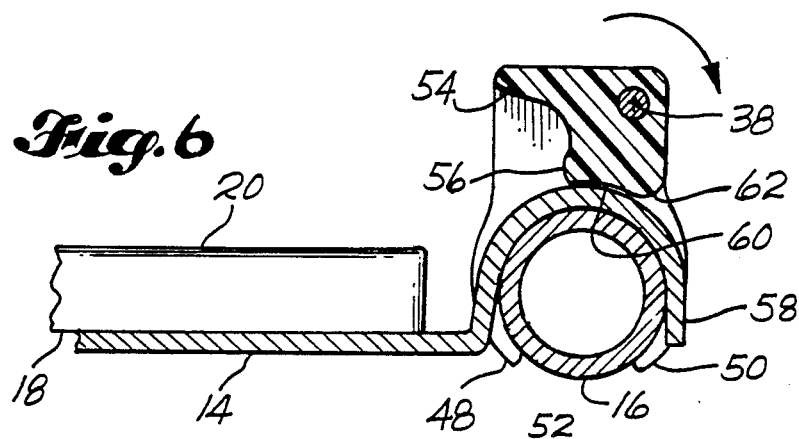
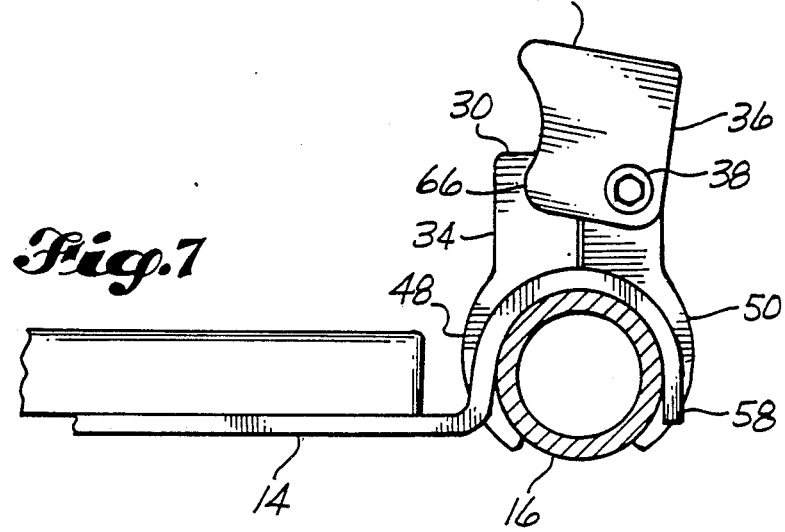
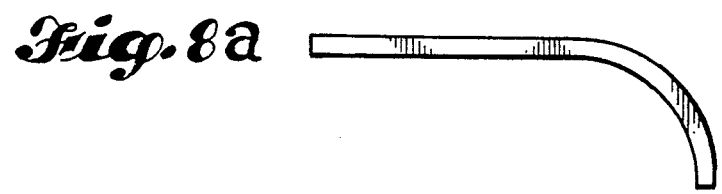
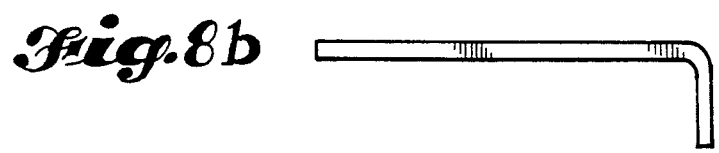

4,997,154

QUICK RELEASE CLAMP ASSEMBLY

BACKGROUND OF THE INVENTION

This invention generally relates to support structures and more particularly to a retaining device for hook type support brackets.

Most state of the art wheelchairs are foldable so as to facilitate transportation and storage. Ordinarily such chairs are equipped with a rigid seat and backrest that must be removed before the chair can be folded. One of the problems encountered in designing such a chair is to provide means which will securely attach the seat and backrest to the chair and yet permit them to be quickly and easily removed. Ideally, such attachment means should be easily accessible to the user and operable with a minimal amount of force. They should be designed to minimize the possibility of accidental disengagement of the seat or backrest. Finally, they should be adaptable for use on existing chairs without requiring significant modification of the chair.

Accordingly, it is an object of this invention to provide a quick release clamp assembly which will permit quick and easy installation and removal of the seat and backrest of a wheelchair, particularly a foldable type wheelchair.

Another object of this invention is to provide for such a clamp assembly which will safely secure the seat and backrest to the wheelchair frame and minimize the possibility of an inadvertent release of either.

Another object of this invention to provide for such a clamp assembly which can be adapted to various wheelchair configurations without significant modification of the chair.

It is a further object of this invention to provide for a quick release support bracket assembly for use with wheelchairs or the like including the above disclosed clamp assembly and a hook type support bracket.

SUMMARY OF THE INVENTION

This invention can be broadly summarized as providing for a quick release clamp assembly for use with a hook type support bracket. The clamp assembly includes a clamp adapted to be attached to a shaft such as a frame member of a wheelchair, a walker, or a bicycle and a cam rotatably mounted to the clamp which can be operated between an open and a closed position. The cam, when in the closed position retains the bracket in a predetermined position on the shaft.

The invention can also be broadly described as a quick release support bracket assembly which includes a hook type support bracket and a quick release clamp assembly as described above.

More detailed aspects of the invention include a end plate which cooperates with the clamp to restrict the axial movement of the bracket along the shaft. They also include a tab or protrusion formed in the end plate which engages the surface of the shaft as the cam is moved from the closed to the open position, tending to restrict further movement of the cam toward the open position.

BRIEF DESCRIPTION OF THE DRAWINGS

FIG. 3 is an exploded perspective view of the clamp assembly.

FIGS. 4 and 5 are front views of the clamp assembly also showing the cam in closed and opened positions, respectively.

FIG. 6 is a sectional view taken at 6—6 of FIG. 4.

FIG. 7 is a sectional view taken at 7—7 of FIG. 5.

FIG. 8(a) through 8(c) illustrate alternate hook bracket configurations.

DESCRIPTION OF THE PREFERRED EMBODIMENT

The novel features believed to be characteristic of this invention are set forth in the appended claims. The invention itself, however, may be best understood and its various objectives and advantages best appreciated by reference to the detailed description below in connection with the accompanying drawings.

Figure 1:
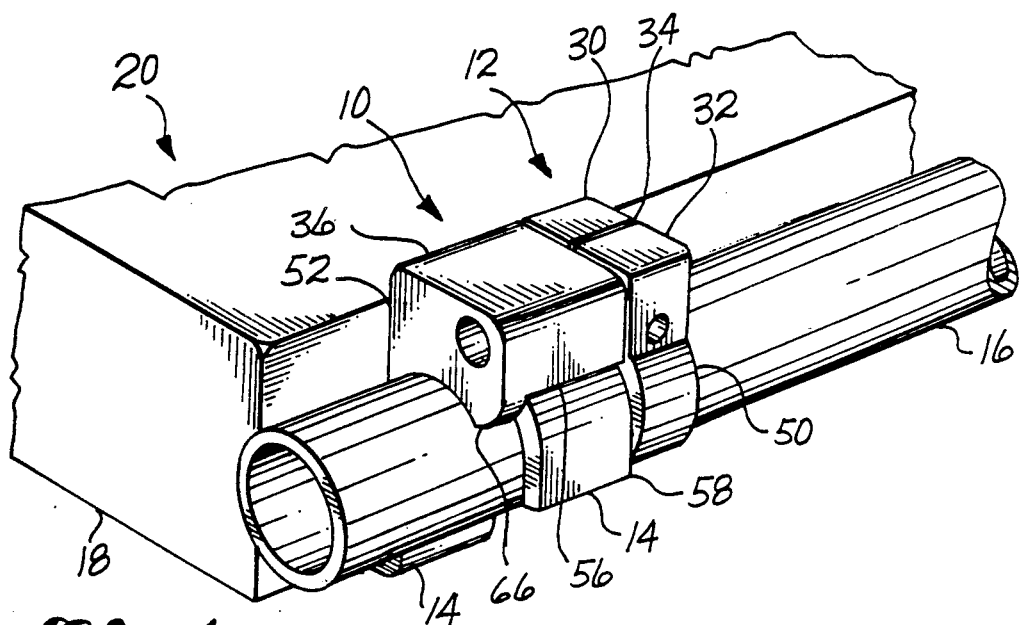
FIGS. 1 and 2 are perspective views of a typical installation of the cam on a wheelchair frame member showing the cam in closed and opened positions, respectively.
Figure 2:
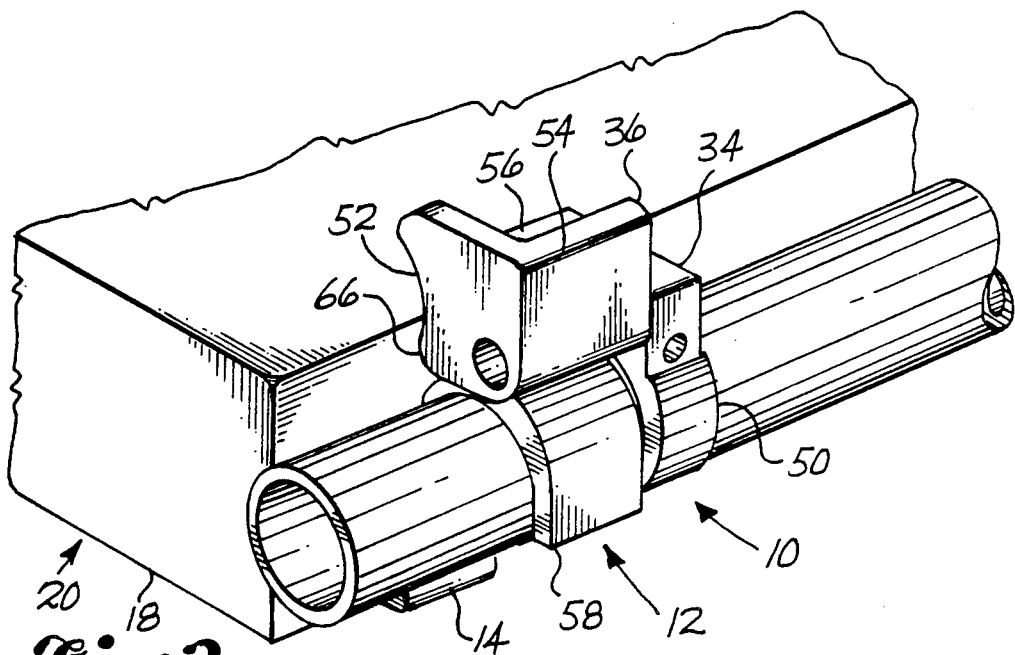

In those drawings a quick release support bracket assembly constructed in accordance with the teachings of the present invention is illustrated and generally designated by the number 10. The support bracket assembly includes a quick release clamp assembly, generally designated by the number 12, and hook type support bracket 14. FIGS. 1 and 2 illustrate a typical installation in which the clamp assembly is secured to tubular frame member 16 of the wheelchair frame. Hook type support bracket 14, shown in more detail in FIGS. 6 and 7 is typically attached to undersurface 18 of wheelchair seat 20 or to a comparable surface of the backrest. Ordinarily, four support bracket assemblies would be used to secure the seat or backrest to the chair frame.

Referring to FIG. 3, it can be seen that clamp assembly 12 includes opposing clamp sections 30 and 32, cam 36, bolts 38 and 40, and tensioning washer 42. Cam 36 is rotatably mounted to section 32 by bolt 38 and spaced apart from it by tensioning washer 42. Bolt 38 is tightened until shoulder 44 rests against surface 46 providing a predetermined clearance between the cam and the clamp and a predetermined compression of washer 42. In this manner the force required to rotate cam 36 is controlled. Sections 30 and 32 have opposing curved lower sections 48 and 50, respectively, which are sized to grasp frame member 16 when the sections are joined by bolt 40.

Cam 36 is preferably of one piece construction having end plate 52, lever 54 and lobe 56. Referring to FIG. 4 it can be seen that the lobe is configured and positioned so that when the cam is in the closed portion the curved portion 58 of bracket 14 is accommodated between surface 60 of the lobe and frame member 16. Also, end plate 52 cooperates with clamp 30 to restrict axial movement of the bracket along the tube. Accordingly, it can be seen that when the cam is in the closed position the bracket is restricted against any significant axial or vertical movement and thereby "captivated" by the clamp assembly.

Lobe 56 also includes protrusion 62 which functions as an "over the center" safety device tending to restrict the rotation of the cam from the closed to the opened position. Referring to FIG. 6, it can be seen that when the cam is in the closed position, protrusion 62 is located to the right of a line connecting the centers of frame member 16 and bolt 38. As the cam is rotated in the direction indicated by the arrow in FIG. 6, protrusion 62 contacts the surface of frame member 16, making it increasingly difficult to open the cam until the protrusion passes over center. For added safety, another over the center protrusion 66 is formed in end plate 52 to further restrict rotation of the cam toward the open position. Of course, the cam can be opened if sufficient upward force is applied to lever 54 but each of the protrusions reduces the likelihood of an accidental opening. Obviously, other protrusions could be formed elsewhere in the assembly to similarly restrict the motion of the cam to accomplish the same purpose.

In operation, in order to install the seat or backrest in the chair, the user merely needs to rotate the cam in each appropriate clamp assembly by grasping lever 54 and rotating the cam in a clockwise direction as shown in FIG. 6. Next, the seat is positioned so that curved portion 58 of each bracket rests against the frame member adjacent the end plates of the cams. Then the seat is slid along the frame member so that each of the brackets is positioned beneath an associated cam and adjacent to the clamp. Finally, while holding the seat in position the user rotates each of the cams into the closed position, securing the brackets. To remove the seat (or backrest) the procedure is simply reversed.

In the preferred embodiment described above the clamp assembly is configured for use with a frame member having a cylindrical cross section but it obviously could be modified for use with other cross-sectional shapes such as square or elliptical. Also, the invention could be easily adapted for use with other types of hook brackets such as those shown in FIGS. 8(a) through 8(c).

Thus, it can be seen that the present invention provides for a quick release clamp assembly which incorporates many novel features and offers significant advantages over the prior art. Although only one embodiment of this invention has been illustrated and described it is to be understood that obvious modifications can be made of it without departing from the true scope and spirit of the invention.

I claim:

1. A quick release clamp assembly for use with a hook type support bracket or the like comprising:
   mounting means adapted to be attached to a shaft; and,
   a cam rotatably mounted to the mounting means for operation between open and closed positions, the cam including a lobe which cooperates with the shaft to captivate the bracket when the cam is in the closed position.

2. The clamp assembly of claim 1 wherein the mounting means is a clamp.

3. The clamp assembly of claim 2 wherein the clamp includes two opposing sections adjustably joined by a fastener.

4. The clamp assembly of claim 1 further including safety means for restricting the movement of the cam from the closed position toward the open position.

5. The clamp assembly of claim 4 wherein the safety means includes a protrusion associated with the assembly which is frictionally engaged as the cam is rotated from the closed toward the open position.

6. The clamp assembly of claim 5 wherein the cam includes an over the center protrusion which frictionally engages the shaft as the cam is rotated from the closed toward the open position.

7. The clamp assembly of claim 1 wherein the cam further includes an end plate which cooperates with the mounting means to restrict the axial movement of the bracket.

8. The clamp assembly of claim 7 wherein the end plate includes an over the center protrusion which frictionally engages the shaft as the cam is rotated from the closed toward the open position.

9. A quick release support bracket assembly comprising:
   a hook type support bracket; mounting means adapted to be attached to a shaft; and,
   a cam rotatably mounted to the mounting means for operation between open and closed positions, the cam including a lobe which cooperates with the shaft to captivate the bracket when the cam is in the closed position.

10. The support bracket assembly of claim 9 wherein the mounting means is a clamp.

11. The support bracket assembly of claim 10 wherein the clamp includes two opposing halves adjustably joined by a fastener.

12. The support bracket assembly of claim 9 further including safety means for restricting the movement of the cam from the closed position to the open position.

13. The support bracket assembly of claim 12 wherein the safety means includes a protrusion associated with the assembly which is frictionally engaged as the cam is rotated from the closed toward the open position.

14. The clamp assembly of claim 9 wherein the lobe includes an over the center protrusion which frictionally engages the shaft as the cam is rotated from the closed toward the open position.

15. The support bracket assembly of claim 9 wherein the cam further includes an end plate which cooperates with the mounting means to restrict the axial movement of the bracket.

16. The support bracket assembly of claim 15 wherein the end plate includes an over the center protrusion which frictionally engages the shaft as the cam is rotated from the closed toward the open position.

17. A quick release clamp assembly for use with a hook type bracket or the like comprising:
   a clamp adapted to be joined to a shaft; and
   a cam rotatably mounted to the clamp for operation between open and closed positions, the cam including a lobe and an end plate which cooperate with the shaft and the clamp, respectively, to captivate the bracket when the cam is in the closed position.

18. A quick release clamp assembly for use with a hook type bracket or the like comprising:
   a clamp adapted to be secured to a cylindrical shaft, the clamp having two opposing sections adjustably joined by a fastener; and
   a cam rotatably mounted to the clamp for operation between open and closed positions, the cam including a lobe and an end plate which cooperate with the shaft and the clamp, respectively, to captivate the bracket when the cam is in the closed position, and the lobe further including an over the center protrusion which frictionally engages the shaft as the cam is rotated from the closed toward the open position.

* * * * *